(12) United States Patent
Delporte

(10) Patent No.: US 10,345,327 B2
(45) Date of Patent: Jul. 9, 2019

(54) METHOD AND DEVICE FOR ESTIMATING THE AIRSPEED OF AN AIRCRAFT

(71) Applicant: Airbus Operations (S.A.S.), Toulouse (FR)

(72) Inventor: Martin Delporte, Fonsorbes (FR)

(73) Assignee: Airbus Operations (S.A.S.), Toulouse (FR)

( * ) Notice: Subject to any disclaimer, the term of this patent is extended or adjusted under 35 U.S.C. 154(b) by 774 days.

(21) Appl. No.: 14/948,084

(22) Filed: Nov. 20, 2015

(65) Prior Publication Data
US 2016/0161524 A1  Jun. 9, 2016

(30) Foreign Application Priority Data
Dec. 5, 2014  (FR) ...................................... 14 61988

(51) Int. Cl.
| | | |
|---|---|---|
| *G01P 5/175* | (2006.01) | |
| *G01P 21/02* | (2006.01) | |
| *G01P 5/14* | (2006.01) | |
| *G01P 5/16* | (2006.01) | |

(52) U.S. Cl.
CPC ................ *G01P 5/175* (2013.01); *G01P 5/14* (2013.01); *G01P 5/16* (2013.01); *G01P 21/025* (2013.01)

(58) Field of Classification Search
CPC ............... G01P 5/175; G01P 5/16; G01P 5/14
See application file for complete search history.

(56) References Cited

U.S. PATENT DOCUMENTS

| | | | |
|---|---|---|---|
| 5,394,689 A | 3/1995 | D'Onofrio | |
| 2008/0288130 A1* | 11/2008 | Feau .................... | G01P 13/025 701/3 |
| 2013/0018533 A1* | 1/2013 | Feau .................... | F01D 17/06 701/14 |
| 2016/0025764 A1* | 1/2016 | Semat .................... | G01P 5/14 73/861.65 |

FOREIGN PATENT DOCUMENTS

| | | |
|---|---|---|
| EP | 0 244 344 | 11/1987 |
| EP | 2 546 658 | 1/2013 |

OTHER PUBLICATIONS

French Search Report for Application No. 14 61988 dated Apr. 1, 2015.

* cited by examiner

*Primary Examiner* — Mohamed Charioui
*Assistant Examiner* — Jeremy A Delozier
(74) *Attorney, Agent, or Firm* — Jenkins, Wilson, Taylor & Hunt, P.A.

(57) ABSTRACT

A method and device for estimating the airspeed of an aircraft includes a first estimation unit configured to estimate the airspeed of the aircraft according to a first estimation method, a second estimation unit configured to estimate the airspeed of the aircraft according to a second estimation method, a weighting unit configured to weight the two airspeeds estimated by the first and second estimation methods and a computation unit configured to sum the weighted airspeeds so as to obtain an estimated airspeed of the aircraft.

11 Claims, 3 Drawing Sheets

METHOD AND DEVICE FOR ESTIMATING THE AIRSPEED OF AN AIRCRAFT

CROSS-REFERENCE TO RELATED APPLICATION

This application claims the benefit of and priority to French patent application No. 14 61988 filed on Dec. 5, 2014, the entire disclosure of which is incorporated by reference herein.

TECHNICAL FIELD

The present disclosure relates to a method and a device for estimating the airspeed of an aircraft.

The term "airspeed" equally denotes the Mach number of the aircraft (defined as the ratio between the speed of the aircraft and the speed of sound in the conditions of flight of the aircraft) and the conventional speed of the aircraft (called or designated "calibrated airspeed").

BACKGROUND

Generally, the airspeed is estimated on board the aircraft from the measurement of two pressures:
- firstly, the total pressure, obtained using a single Pitot probe; and
- secondly, the static pressure, measured using static pressure probes which are flush with the skin of the fuselage of the aircraft.

The Pitot probes and the static pressure probes are exposed to the outside conditions and can be disturbed by elements or objects which can partially or totally block the ducts upstream of the corresponding sensor, leading to incorrect pressure measurements.

It can therefore be useful to have an alternative method for estimating the airspeed of an aircraft which is independent of the Pitot probes. It is known practice in this context to use the lift equation, also called ascending force equation, which links four parameters, namely the vertical load factor, the incidence, the weight and the speed. The knowledge of the incidence, of the load factor and of the weight of the aircraft makes it possible to reconstruct an equivalent speed in real time. If, in addition, the static pressure is known, this also makes it possible to reconstruct the Mach number.

However, such an estimation of the airspeed, using the lift equation, is very accurate only in a limited part of the flight envelope of an aircraft for relatively low speeds. In particular, in the cruising flight envelope of an aircraft such as an airplane, the accuracy of the estimation of the airspeed is very degraded, even unusable.

SUMMARY

The present disclosure aims to provide an estimation of the airspeed of an aircraft, which is independent of pressure measurements obtained from the Pitot probes and which is accurate over the entire flight envelope of the aircraft.

To this end, the present disclosure relates to a method for estimating the airspeed of an aircraft, comprising an automatic and iterative implementation step, the method comprising:

(A) performing an estimation of the airspeed of the aircraft according to a first estimation method by using a lift equation, the airspeed estimated according to this first estimation method being called or designated airspeed by incidence.

According to the disclosure herein, the method comprises the following steps, implemented automatically and iteratively:

(B) performing an estimation of the airspeed of the aircraft according to a second estimation method by using at least two pressure values obtained from at least two static pressure sensors arranged on the aircraft such that:
- a first of the at least two sensors is positioned so that the pressure measured by this first sensor varies as a function of the Mach number of the aircraft; and
- a second of the at least two sensors is positioned so that:
  - the pressure measured by this second sensor does not vary as a function of the Mach number of the aircraft; or
  - the pressure measured by this second sensor varies as a function of the Mach number of the aircraft in a lesser way than the pressure measured by the first sensor, the airspeed estimated according to this second estimation method being called or designated airspeed by pressure, (C) weighting the airspeed by incidence by a first coefficient and weighting the airspeed by pressure by a second coefficient, the first coefficient and the second coefficient depending on the value of at least one parameter of the flight envelope of the aircraft, (D) summing the weighted airspeed by incidence obtained in step (or paragraph) (C) above and the weighted airspeed by pressure obtained in step (C) so as to obtain an estimated airspeed of the aircraft.

By virtue of the inclusion of the estimations from two different estimation methods of the airspeed, which are independent of measurements obtained from Pitot probes and with a weighting as a function of a parameter of the flight envelope of the aircraft, by giving each method a higher or lower weighting as a function of its effectiveness in the envelope concerned, the method according to the present disclosure thus provides an estimation of the airspeed that is accurate over the entire flight envelope of the aircraft.

According to different embodiments of the disclosure herein, which can be taken together or separately:
- the first and second coefficients vary between 0 and 1 as a function of the parameter of the flight envelope of the aircraft, the sum of the first coefficient and of the second coefficient being always equal to 1, regardless of the value of the parameter of the flight envelope of the aircraft;
- the first coefficient is equal to 1 when the value of the parameter of the flight envelope of the aircraft is below a first predetermined threshold and equal to 0 when the value of the parameter of the flight envelope of the aircraft is above a second predetermined threshold;
- the first coefficient decreases between the first and second thresholds or the first and second predetermined thresholds are identical;
- at least one altitude parameter is used as parameter of the flight envelope of the aircraft;
- at least one speed parameter is used as parameter of the flight envelope of the aircraft;
- the value of the parameter of the flight envelope, used in step (C) in a current iteration, is equal to the airspeed estimated in step (D) in a preceding iteration, directly preceding the current iteration;
- the method comprises steps of, when the value of the parameter of the flight envelope of the aircraft is above a predetermined threshold:

filtering the airspeed by pressure and the airspeed by incidence so as to obtain a low-frequency component of the airspeed by pressure and a high-frequency component of the airspeed by incidence;

in step (D), refining the estimated airspeed, by combining the low-frequency component of the airspeed by pressure and the high-frequency component of the airspeed by incidence.

In a particular embodiment, the method comprises the following steps:

determining a correction factor dependent on the estimated airspeed obtained in step (D);

measuring a static pressure in an engine cell of the aircraft, called nacelle static pressure; and calculating an estimated static pressure by multiplying the nacelle static pressure with the correction factor.

The disclosure herein also relates to a device for estimating the airspeed of an aircraft, the device comprising a first estimation unit configured to estimate the airspeed of the aircraft according to a first estimation method using the lift equation, the airspeed estimated by the first estimation unit being called or designated airspeed by incidence.

According to the disclosure herein, the device further comprises:

a second estimation unit configured to estimate the airspeed of the aircraft according to a second estimation method using at least two pressure values obtained from at least two static pressure sensors such that:

a first of the at least two sensors is positioned so that the pressure measured by this first sensor varies as a function of the Mach number of the aircraft; and a second of the at least two sensors is positioned so that:

the pressure measured by this second sensor does not vary as a function of the Mach number of the aircraft; or the pressure measured by this second sensor varies as a function of the Mach number of the aircraft in a lesser way than the pressure measured by the first sensor, the airspeed estimated by this second estimation unit being called or designated airspeed by pressure;

a weighting unit configured to weight the airspeed by incidence by a first coefficient and to weight the airspeed by pressure by a second coefficient, the first coefficient and the second coefficient depending on the value of at least one parameter of the flight envelope of the aircraft;

a computation unit configured to sum the weighted airspeed by incidence and the weighted airspeed by pressure so as to obtain an estimated airspeed of the aircraft.

According to one aspect of the disclosure herein, the device comprises:

a computation unit configured to determine a correction factor dependent on the estimated airspeed;

a measurement unit configured to measure the static pressure in an engine cell of the aircraft, called or designated nacelle static pressure; and a computation unit configured to calculate an estimated static pressure by multiplying the nacelle static pressure with the correction factor.

The disclosure herein also relates to an aircraft, in particular a transport airplane, comprising a device as described previously.

BRIEF DESCRIPTION OF THE DRAWINGS

The attached figures provide a good understanding as to how the disclosure herein can be produced. In these figures, identical references denote similar elements.

DETAILED DESCRIPTION

Figure 1:
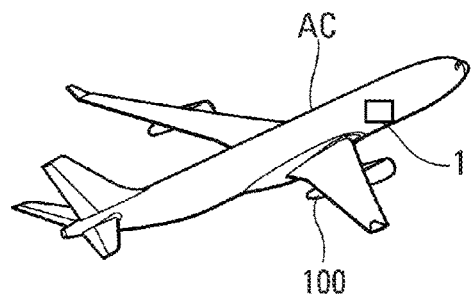
FIG. 1 is a schematic view of an aircraft comprising a device for estimating the airspeed.

FIG. 1 schematically illustrates an aircraft AC, notably a transport airplane, to which a device 1 for estimating the airspeed of the aircraft AC can be applied.

The estimation device 1 (hereinafter denoted device 1), as shown for example in FIG. 2, comprises, according to the disclosure herein:

a first estimation unit 10 configured to estimate the airspeed of the aircraft according to a first estimation method using the lift equation, the airspeed estimated by the first estimation unit 10 being called or designated airspeed by incidence VAI;

a second estimation unit 20A, 20B configured to estimate the airspeed of the aircraft according to a second estimation method using at least two pressure values obtained from at least two static pressure sensors arranged on the aircraft such that:

a first of the at least two sensors is positioned so that the pressure measured by this first sensor varies as a function of the Mach number of the aircraft; and a second of the at least two sensors is positioned so that:

the pressure measured by this second sensor does not vary as a function of the Mach number of the aircraft; or the pressure measured by this second sensor varies as a function of the Mach number of the aircraft in a lesser way than the pressure measured by the first sensor, the airspeed estimated by this second estimation unit 20A, 20B being called or designated airspeed by pressure VAP;

a weighting unit 30 configured to weight the airspeed by incidence VAI by a first coefficient 31 obtained from a first weighting element 30A of the weighting unit 30 and to weight the airspeed by pressure VAP by a second coefficient 32 obtained from a second weighting element 30B of the weighting unit 30, the first coefficient 31 and the second coefficient 32 depending on the value of at least one parameter of the flight envelope of the aircraft such as the altitude or the speed;

a computation unit 40 configured to sum the weighted airspeed by incidence VAIP and the weighted airspeed by pressure VAPP so as to obtain an estimated airspeed VAE of the aircraft.

The device 1 further comprises a data transmission unit (not represented) configured to transmit the estimated airspeed VAE to a user system (not represented), for example to a display unit or to an embedded system (or computer).

Figure 2:
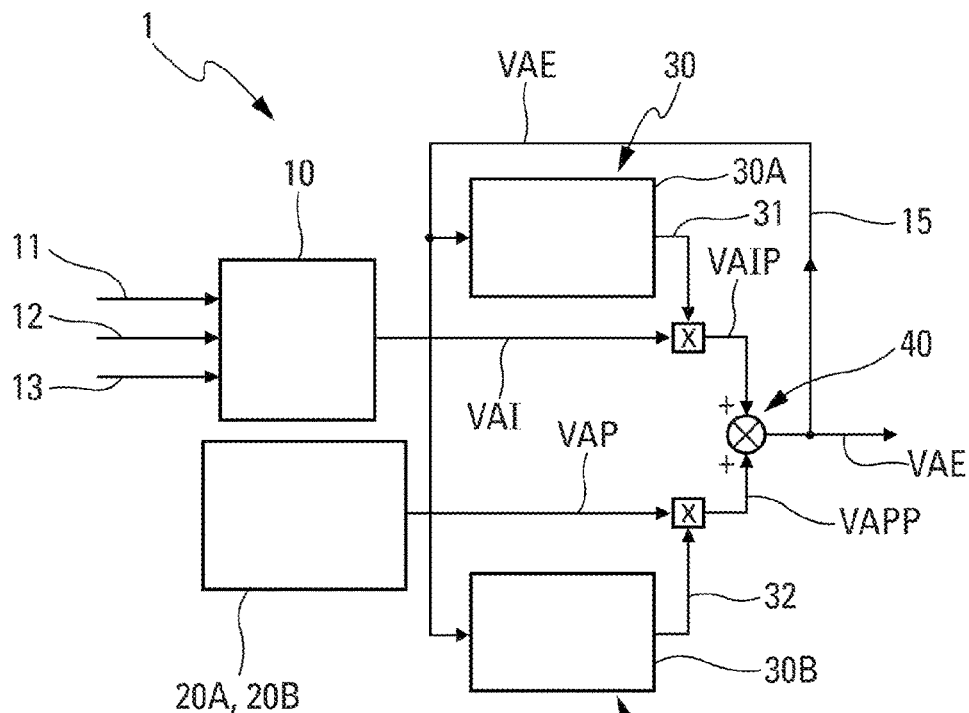
FIG. 2 is a block diagram of a particular embodiment of a device for estimating the airspeed of an aircraft comprising first and second airspeed estimation units.

In a preferred embodiment, the value of the parameter of the flight envelope, used by the weighting unit 30, is equal to the airspeed VAE estimated by the computation unit 40 in a preceding estimation of the device 1, preferably in a directly preceding iteration of the estimation, as represented by the link 15 in FIG. 2.

Figure 3A:
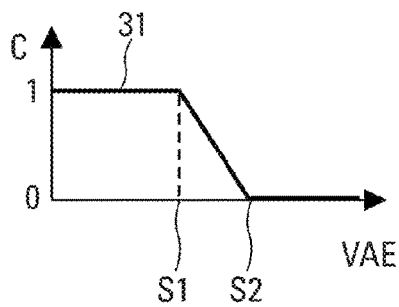
FIG. 3A is a graph illustrating the trend of a first weighting coefficient as a function of the airspeed.
Figure 3B:
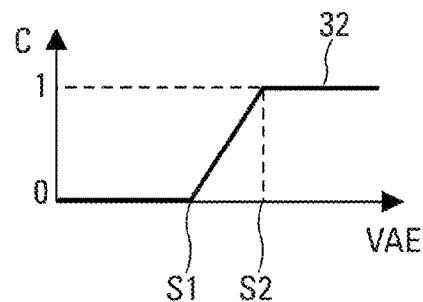
FIG. 3B is a graph illustrating the trend of a second weighting coefficient as a function of the airspeed.

As represented in FIG. 2, the weighting unit 30 comprises the first weighting element 30A and the second weighting element 30B. The first and second weighting elements 30A, 30B respectively weight the airspeed by incidence VAI by the first coefficient 31 and the airspeed by pressure VAP by the second coefficient 32 so as to obtain the weighted airspeed by incidence VAIP and the weighted airspeed by pressure VAPP. The values of these coefficients 31 and 32 depend on the parameter of the flight envelope that is chosen. An example is given by FIGS. 3A and 3B in which the value of the weighting coefficient C varies as a function of the airspeed VAE estimated in the preceding iteration. In these exemplary embodiments of the disclosure herein, the first and second coefficients 31, 32 vary between 0 and 1 as a function of the airspeed of the aircraft.

The sum of the coefficient 31 and of the coefficient 32 for a given parameter of the flight envelope is always equal to 1. The estimated airspeed VAE is then a barycenter of the two weighted airspeeds VAIP and VAPP with the weights determined by the weighting coefficients 31 and 32.

The coefficient 31 is equal to 1 when the value of the parameter of the flight envelope of the aircraft is below a first predetermined threshold S1, for example 0.4 Mach, and it is equal to 0 when the value of the parameter of the flight envelope of the aircraft is above a second predetermined threshold S2, for example 0.5 Mach. Conversely, the second coefficient 32 is equal to 0 when the value of the parameter of the flight envelope of the aircraft is below the threshold S1, for example 0.4 Mach, and it is equal to 1 when the value of the parameter of the flight envelope of the aircraft is above the threshold S2, for example 0.5 Mach.

The coefficient 31 decreases, preferably but not exclusively, linearly, between the thresholds S1 and S2. Conversely, the coefficient 32 increases, preferably but not exclusively, linearly, between the thresholds S1 and S2.

According to a variant that is not represented, the first and second predetermined thresholds S1 and S2 are identical. The first coefficient 31 then switches for example from 1 to 0 when the aircraft crosses the threshold S1 or S2 and the coefficient 32 then switches from 0 to 1 when the aircraft crosses the threshold S1 or S2.

It is also possible to use at least one altitude parameter as parameter of the flight envelope of the aircraft. The threshold S1 and the threshold S2 are then for example respectively equal to 20 000 and 25 000 feet.

Figure 4:
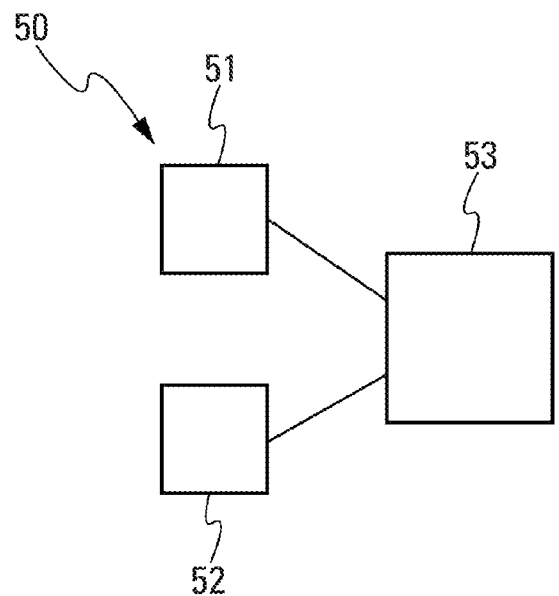
FIG. 4 is a block diagram of a data processing unit.

In a particular embodiment, the device 1 also comprises a data processing unit 50 as represented in FIG. 4. This data processing unit 50 comprises a first filter 51 configured to filter, in the usual manner, the airspeed by pressure VAP so as to obtain a low-frequency component of the airspeed by pressure VAP and a second filter 52 configured to filter, in the usual manner, the airspeed by incidence VAI so as to obtain a high-frequency component of the airspeed by incidence VAI, when the airspeed of the aircraft is above a predetermined threshold. In particular, in the case of a cruising flight of a transport airplane, the value of this predetermined threshold can for example correspond to 0.8 Mach or to 270 nautical miles per hour (approximately 500 km/h) depending on whether the airspeed corresponds respectively to a Mach number or to a calibrated speed.

This processing unit 50 also comprises a computation unit 53 for refining, in this situation, the estimated airspeed VAE determined by the computation unit 40, by combining the low-frequency component of the airspeed by pressure VAP and the high-frequency component of the airspeed by incidence VAI.

When the airspeed exceeds the predetermined threshold, the airspeed by incidence is correct for its dynamic range but may exhibit a significant bias whereas the airspeed by pressure has little bias but an error may appear during engine speed transients. The data processing unit 50 thus makes it possible for the device to use the low-frequency component of the airspeed by pressure and the high-frequency component of the airspeed by incidence at cruising speeds so as to limit the abovementioned inaccuracies.

As represented in FIG. 2, the estimation unit 10 is configured to estimate the airspeed by incidence VAI of the aircraft from the lift equation by using the following three parameters: the vertical load factor received by a link 11, the incidence received by a link 12 and the weight received by a link 13. For this, the estimation unit 10 uses the following lift equation:

$$n_z mg = qSCz_{\square}(\square)$$

in which:
nz is the vertical load factor;
m is the weight of the aircraft;
g is equal to 9.81 m/s$^2$;
S is the reference surface;
$Cz_{\square}$ is the gradient (that is to say the drift relative to $\square$) of the aerodynamic coefficient of ascending force. This is a characteristic of the aircraft (for a given aerodynamic configuration);
$\square_0$ is the incidence of zero ascending force. This is a characteristic of the aircraft (for a given aerodynamic configuration);
$\square\square$ is the measured incidence; and
q is the dynamic pressure, bearing out the following equations:

$$q = 0.7 Ps\, M^2 \quad (1)$$

or $$q = \tfrac{1}{2} \square\, VEAS^2 \quad (2),$$

in which:
Ps is the static pressure;
M is the Mach number;
VEAS is the equivalent speed, very close to the calibrated speed;
$\square_0$ is the density of the air at sea level (this is a constant equal to 101325 Pa).

The first equation (1) that makes it possible to calculate q is valid whatever the altitude of the aircraft. By inserting it into the lift equation, it is possible to calculate the Mach number. It is then possible to deduce therefrom the calibrated speed if necessary.

The second equation (2) making it possible to calculate q is an approximation valid at low altitude. By inserting it into the lift equation, it is possible to directly calculate the calibrated speed. It is then possible to deduce therefrom the Mach number if necessary.

The estimation unit 10 estimates the airspeed by incidence VAI independently of the Pitot probes.

Figure 5:
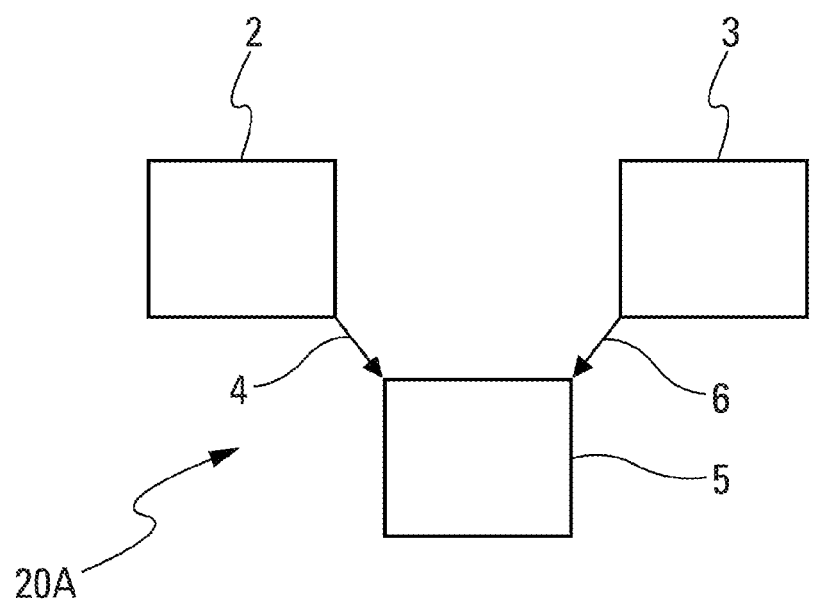
FIG. 5 is a block diagram of a first variant of the second airspeed estimation unit.
Figure 6:
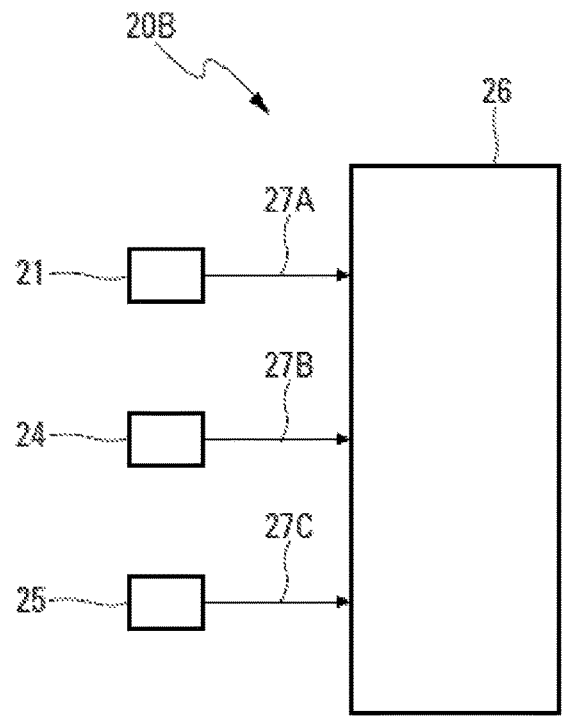
FIG. 6 is a block diagram of a second variant of the second airspeed estimation unit.

The estimation unit 20A, 20B makes it possible to estimate the airspeed by pressure VAP according to two variants respectively illustrated in FIGS. 5 and 6.

FIG. 5 relates to the first variant, in which the estimation unit 20A uses at least two static pressure sensors, one of which is positioned so that the measured pressure varies as a function of the Mach number.

In this variant, the estimation unit 20A comprises a first measurement unit 2 configured to measure a first static pressure of the ambient air in a first measurement zone of the aircraft and a second measurement unit 3 configured to measure a second pressure of the ambient air in a second measurement zone of the aircraft. The second pressure has a lower value than the first static pressure. The first measurement unit 2 measures the first static pressure using at least one static pressure measurement probe, and notably several measurement probes.

Similarly, the second measurement unit 3 measures the second pressure using at least one static pressure measurement probe.

The estimation unit 20A also comprises a computation unit 5 configured to estimate the Mach number using the following expression:

$$M = \sqrt{\frac{\sqrt{k^4 + 4k^2} - k^2}{2}}$$

the parameter k bearing out the expression $$k = Z\left(1 - \frac{P}{P_S}\right)$$

in which Z is a parameter dependent on the position of the second measurement zone on the aircraft.

The data collected by the first and second measurement units 2 and 3 are transmitted to the computation unit 5, respectively, via links 4 and 6.

Measurement zones for the first static pressure and the second pressure are chosen which make it possible to obtain a difference in values between the first static pressure and the second pressure. In effect, the greater the difference between the value of the first static pressure and the value of the second pressure, the better the estimation of the Mach number of the aircraft. To this end, provision is notably made to position the first measurement unit 2 at a point of the aircraft where the static pressure does not depend very much on the Mach number and the second measurement unit 3 at a point of the aircraft where the pressure on the contrary depends very much on the Mach number. In other words, a choice is made to position the first measurement zone on the aircraft at a position that is less disturbed by the airstream flowing over the aircraft than the second zone. The estimation unit 20A estimates the Mach number independently of the Pitot probes.

FIG. 6 relates to the second variant in which the estimation unit 20B uses at least two pressures obtained from the engines.

A nacelle static pressure and an engine total pressure are selected to determine, respectively from the static pressure of the ambient air and the total pressure, the Mach number of the aircraft. The nacelle static pressure is determined by a probe situated in an engine cell of the aircraft. The determination of the engine total pressure may involve, in addition to the nacelle static pressure measurements, measurements of parameters chosen from:

at least one compression output pressure;
the speed of rotation of at least one compression/expansion coupling; and
the temperature of the ambient air.

Thus, in this exemplary embodiment, the estimation unit 20B comprises, as represented in FIG. 6: a unit 21 for measuring the static pressure of the aircraft, situated for example inside an engine nacelle of the aircraft, a unit 24 for measuring the speed of rotation of a fan of the engine and a unit 25 for measuring the temperature of the air. The second estimation unit 20B further comprises a processing unit 26, linked to the measurement units 21, 24 and 25 respectively by links 27A, 27B and 27C. The processing unit 26 is configured to estimate the Mach number using the above-mentioned parameters and means for modeling an aerodynamic field and/or a thermodynamic cycle of at least one component of the engine, and notably the fan. The estimation unit 20B thus estimates the Mach number independently of the Pitot probes.

Figure 7:
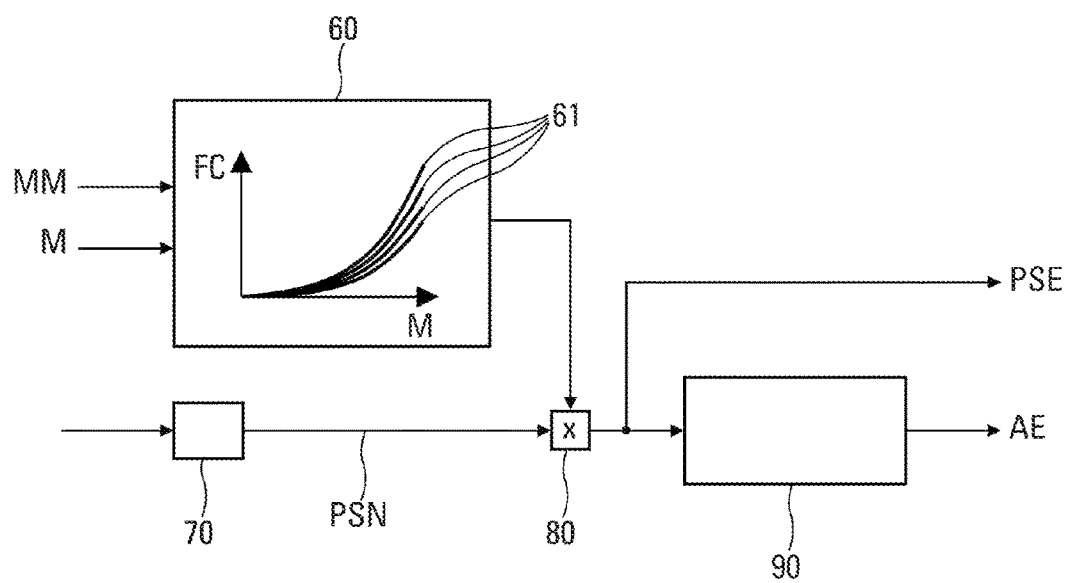
FIG. 7 is a schematic view of a static pressure estimation unit of the aircraft.

As represented in FIG. 7, the device 1 can comprise:
a computation unit 60 configured to determine a correction factor FC dependent on the airspeed and in particular on the estimated Mach number M when the estimated airspeed corresponds to the estimated Mach number;
a measurement unit 70 configured to measure the static pressure inside an engine nacelle of the aircraft, called or designated nacelle static pressure PSN; and
a computation unit 80 configured to calculate an estimated static pressure PSE by multiplying the nacelle static pressure PSN by the correction factor FC.

The values of the correction factor FC are determined experimentally from measurements performed during in-flight tests, called or designated experimental measurements MM. These concern, for example, the speed of rotation of the engine. Based on the experimental value MM, the curve giving the value of the coefficient factor FC as a function of the Mach number M is not identical. A few examples of different curves 61 are represented in FIG. 7, each of them corresponding to a particular experimental measurement value.

The device 1 further comprises a conversion unit 90 configured to convert the estimated static pressure PSE into estimated altitude AE by using the international barometric heighting formula. The device 1 thus makes it possible to estimate the altitude by using the estimated Mach number ME, that is to say independently of the Pitot probes and accurately over all of the flight envelope of the aircraft.

Moreover, as indicated previously, the airspeed can correspond to a Mach number or to a calibrated speed. The device 1 can also comprise a computation unit not represented to convert the estimated Mach number into calibrated speed of the aircraft when the estimated airspeed VAE corresponds to an estimated Mach number or to convert the estimated calibrated speed into Mach number when the estimated airspeed VAE corresponds to a calibrated speed. The conversion of the estimated Mach number into conventional speed or of the estimated calibrated speed into Mach number is done in the usual manner.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for estimating an airspeed of an aircraft, comprising an automatic and iterative implementation step, the method comprising:
   (A) estimating the airspeed of the aircraft according to a first estimation method by using a lift equation, the airspeed estimated according to this first estimation method being called airspeed by incidence, the method comprising steps, implemented automatically and iteratively, of:
   (B) estimating airspeed of the aircraft according to a second estimation method by using at least two pressure values obtained from at least two static pressure sensors arranged on the aircraft such that:
      a first of the at least two static pressure sensors is positioned so that a pressure measured by this first sensor varies as a function of a Mach number of the aircraft; and
      a second of the at least two static pressure sensors is positioned so that the second of the at least two static pressure sensors is less disturbed by an airstream flowing over the aircraft than the first of the at least two static pressure sensors; and
   the second of the at least two static pressure sensors is positioned so that:
      the pressure measured by this second sensor does not vary as a function of the Mach number of the aircraft; or
      the pressure measured by this second sensor varies as a function of the Mach number of the aircraft in a lesser way than the pressure measured by the first sensor,
   the airspeed estimated according to the second estimation method being designated airspeed by pressure;
   (C) weighting the airspeed by incidence by a first coefficient and weighting the airspeed by pressure by a second coefficient, the first coefficient and the second coefficient depending on a value of at least one parameter of a flight envelope of the aircraft;
   (D) summing a weighted airspeed by incidence obtained in step (C) and a weighted airspeed by pressure obtained in step (C) to obtain an estimated airspeed of the aircraft;
   (E) determining a correction factor dependent on the estimated airspeed obtained in step (D);
   (F) measuring a static pressure in an engine cell of the aircraft, designated nacelle static pressure;
   (G) calculating an estimated static pressure by multiplying the nacelle static pressure by the correction factor; and
   (H) transmitting the estimated airspeed to a user system of the aircraft.

2. The method according to claim 1, in which the first and second coefficients vary between 0 and 1 as a function of the value of the parameter of the flight envelope of the aircraft, the sum of the first coefficient and of the second coefficient being always equal to 1, regardless of the value of the parameter of the flight envelope of the aircraft.

3. The method according to claim 1, in which the first coefficient is equal to 1 when the value of the parameter of the flight envelope of the aircraft is below a first predetermined threshold and equal to 0 when the value of the parameter of the flight envelope of the aircraft is above a second predetermined threshold, the second threshold being higher than the first threshold.

4. The method according to claim 3, in which the first coefficient decreases between the first and second thresholds.

5. The method according to claim 3, in which the first and second predetermined thresholds are identical.

6. The method according to claim 1, in which at least one altitude parameter is used as parameter of the flight envelope of the aircraft.

7. The method according to claim 1, in which at least one speed parameter is used as parameter of the flight envelope of the aircraft.

8. The method according to claim 1, in which the value of the parameter of the flight envelope, used in step (C) in a current iteration, is equal to the airspeed estimated in step (D) in a preceding iteration, directly preceding the current iteration.

9. The method according to claim 1, comprising, when the value of the parameter of the flight envelope of the aircraft is above a predetermined threshold,:
   filtering the airspeed by pressure and the airspeed by incidence to obtain a low-frequency component of the airspeed by pressure and a high-frequency component of the airspeed by incidence;
   in step (D), refining the estimated airspeed, by combining the low-frequency component of the airspeed by pressure and the high-frequency component of the airspeed by incidence.

10. A device for estimating an airspeed of an aircraft, the device comprising:
   a first estimation unit configured to estimate the airspeed of the aircraft according to a first estimation method using a lift equation, the airspeed estimated by the first estimation unit being designated airspeed by incidence, the device comprising:
   a second estimation unit configured to estimate the airspeed of the aircraft according to a second estimation method using at least two pressure values obtained from at least two static pressure sensors such that:
      a first of the at least two static pressure sensors is positioned so that a pressure measured by this first sensor varies as a function of a Mach number of the aircraft; and
      a second of the at least two static pressure sensors is positioned so that the second of the at least two static pressure sensors is less disturbed by an airstream flowing over the aircraft than the first of the at least two static pressure sensors, and the second of the at least two static pressure sensors is positioned so that:

the pressure measured by the second sensor does not vary as a function of the Mach number of the aircraft; or the pressure measured by the second sensor varies as a function of the Mach number of the aircraft in a lesser way than the pressure measured by the first sensor, the airspeed estimated by this second estimation unit being designated airspeed by pressure;

a weighting unit configured to weight the airspeed by incidence by a first coefficient and to weight the airspeed by pressure by a second coefficient, the first coefficient and the second coefficient depending on the value of at least one parameter of a flight envelope of the aircraft;

a computation unit configured to sum a weighted airspeed by incidence and a weighted airspeed by pressure so as to obtain an estimated airspeed of the aircraft;

a computation unit configured to determine a correction factor dependent on the estimated airspeed;

a measurement unit configured to measure the static pressure in an engine cell of the aircraft, designated nacelle static pressure;

a computation unit configured to calculate an estimated static pressure by multiplying the nacelle static pressure by the correction factor; and a data transmission unit configured to transmit the estimated airspeed to a user system of the aircraft.

11. An aircraft comprising a device according to claim 10.

* * * * *